United States Patent Office 3,093,625
Patented June 11, 1963

3,093,625
PRODUCTION OF POLYMERS OF OLEFINICALLY UNSATURATED HYDROCARBONS WITH A CATALYST OF ALUMINUM, ALUMINUM TRICHLORIDE AND A TITANIUM TETRAHALIDE
Herbert Friederich, Worms, and Wolfgang Lehnerer, Ludwigshafen (Rhine), Germany, assignors to Badische Anilin- & Soda-Fabrik Aktiengesellschaft, Ludwigshafen (Rhine), Germany
No Drawing. Filed Oct. 2, 1956, Ser. No. 613,396
Claims priority, application Germany Oct. 28, 1955
1 Claim. (Cl. 260—88.2)

This invention relates to the production of polymers of olefinically unsaturated hydrocarbons in the presence of catalysts.

It is known to polymerize ethylene in the presence of a mixture of aluminium chloride, titanium tetrachloride and a metal binding hydrogen chloride, in particular aluminium, under increased pressure, advantageously at 30 to 80 atmospheres or more, and at elevated temperature, preferably at 130° to 180° C. (German patent specification No. 874,215).

We have now found that olefinically unsaturated hydrocarbons can be polymerized to high molecular weight solid and tough products even at low temperatures, as for example even at room temperature, and under lower pressures, even under normal pressure, with the aid of a reaction product of a reducing metal of the 1st to 3rd groups of the periodic system of elements and the halide of a metal of the 4th to 6th subgroups.

Suitable olefinically-unsaturated hydrocarbons are in particular olefines, especially having up to about 8 carbon atoms and in particular having up to about 4 carbon atoms, such as ethylene, propylene, butylene, or isobutylene and also mixtures thereof, and also diolefines, as for example butadiene or isoprene, as well as vinyl hydrocarbons, in particular styrene and its derivatives, as for example its alkyl derivatives.

For the preparation of the catalyst, a halide of a metal of the 4th to 6th subgroups is allowed to react with a reducing metal of the 1st to 3rd groups. Suitable halides of the 4th to 6th subgroups are for example titanium tetrachloride, titanium trichloride, titanium tetrabromide, halides of zirconium or hafnium, vanadium tetrachloride, vanadium oxytrichloride (vanadium-V-oxychloride), halides of niobium or tantalum, chromium trichloride, chromyl chloride ($CrO_2Cl_2$) and halides of molybdenum, tungsten and uranium. Suitable reducing metals are in particular aluminium, sodium, magnesium and zinc, but all metals of the 1st to 3rd groups can be used.

The reducing metals may be used in the form of powder, granules, wire, sheets or foils or as colloidal solutions. Metal alloys may also be advantageous. The mixture may for example be heated for a few minutes at temperatures up to the boiling point of the metal halide. In this way, when using titanium tetrachloride, a partial reduction to titanium trichloride takes place. The duration of the heating and the temperature thereof may be varied within wide limits. Thus a mixture of titanium tetrachloride and aluminium can be heated in a closed vessel to temperatures up to about 300° C., or also shaken for a long time at room temperature. It is especially advantageous to carry out the reaction while excluding air and moisture. It is of special advantage for the reducing metal to have a large surface. For this purpose it may either be finely divided or also used in compact form, for example as a thin sheet. The polymer can then readily be separated mechanically from the metal or with the aid of solvents. The metals may advantageously only be partly reacted with the metal halides, so that metal is present in excess. Also in the case of a complete conversion, metal may be subsequently added to the reaction product. The metal halides may also be allowed to act on the reducing metals in such a way that the latter is coated with a thin film of the reaction product. Obviously, however, larger amounts of metal halide may also be used.

It is often especially favorable to employ in addition an aluminium halide. The aluminimum halide is used in amounts up to about 50% with reference to the halide of a metal of the 4th to 6th subgroups, but it may also be used in an excess up to about 5 times. It is possible to allow the aluminium halide, just like the halide of a metal of the 4th to 6th subgroups, to act in vapor form on the reducing metal. The aluminium halide may also first be allowed to react with the metal, and the halide of the metal of the 4th to 6th subgroups then added.

The reaction can be carried out in the presence of indifferent solvents or diluents, as for example in particular saturated aliphatic, cycloaliphatic or aromatic hydrocarbons, such as pentane, octane, gasoline or gasoline fractions, cyclohexane, tetrahydronaphthalene, decahydronaphthalene, benzene, toluene, xylene, ethylbenzene or naphthalene. The use of aromatic hydrocarbons has a quite special favorable effect.

The catalysts thus prepared may be used directly for the polymerization of olefinically unsaturated hydrocarbons. It is also often especially suitable first to free the resultant catalyst from excess metal halide with indifferent organic liquids, such as benzene or cyclohexane, or halogen-containing hydrocarbons. The metals coated with a thin surface film of the reaction product are already highly active catalysts. The unpurified or extracted catalyst is preferably suspended in an indifferent organic diluent, in particular in the solvents already specified above.

The polymerization of the olefine hydrocarbons and in particular of ethylene may be carried out even at room temperature and under normal pressure. It is preferable to cool during the polymerization. Polymerization may also be effected at moderately raised temperatures, and if desired also at temperatures below room temperature, as for example at 0° C. or even lower. Polymerization may be continuous or discontinuous. Obviously it is possible to work under increased pressure, for example up to about 200 atmospheres and especially preferably between about 20 and 50 atmospheres.

By the polymerization of ethylene a loose powder is obtained which is especially easy to purify. The properties of the polymer may be varied depending on the composition and the nature of the pretreatment of the catalyst. The purification of the polymer may be carried out for example by washing with organic solvents, as for example alcohols or ethers, which may contain inorganic or organic acids. When using large pieces of metal as components of the catalyst, the metal can be separated mechanically and the polymer then purified with hydrochloric acid in methanol, with alcohols or with other organic solvents. The polymers obtained contain very small amounts of impurities. They may be used for all purposes for which olefine polymers are customarily used, as for example for injection molding masses and for the production of foils, films and threads. Obviously waxlike or highly viscous polymers may also be obtained with suitable reaction conditions.

The following examples will further illustrate this invention but the invention is not restricted to these examples. The parts specified are parts by weight.

*Example 1*

4 parts of aluminium powder, 1.7 parts of titanium-4-chloride and 0.2 part of aluminium chloride are heated at 136° C. for 10 minutes while excluding air. The mixture thereby becomes colored red with the formation of titanium-3-chloride. It is suspended in 50 parts of cyclohexane and charged into an autoclave under nitrogen. Ethylene is then forced in at room temperature up to a pressure of 50 atmospheres. After 8 to 12 hours, the polymerization is completed.

After purification with methanolic hydrochloric acid and tetrahydrofurane, 204 parts of solid, film-forming polyethylene are obtained. The melting point is 128° to 131° C.

*Example 2*

5 parts of aluminium powder, 5 parts of titanium-4-chloride, 0.5 part of aluminium chloride and 17 parts of benzene are heated at 80° C. for 2 hours while excluding air and then diluted with 30 parts of cyclohexane. A vigorous current of ethylene is led into the mixture at room temperature and under normal pressure. Solid polyethylene thereby separates out, and is separated after 5 hours and purified by treatment with methanolic hydrochloric acid and tetrahydrofurane.

*Example 3*

2 parts of aluminium powder, 3.4 parts of titanium-4-chloride, 1 part of aluminium chloride and 14 parts of benzene are heated for 2 hours at 60° C. while excluding air. The mixture is then diluted with 40 parts of benzene and treated in an autoclave with ethylene under a pressure of 50 atmospheres at room temperature. After purification with methanolic hydrochloric acid and tetrahydrofurane, 100 parts of solid polyethylene are obtained having the melting point 126° to 129° C.

*Example 4*

0.6 part of aluminium powder, 3.4 parts of titanium-4-chloride, 0.4 part of aluminium chloride and 31 parts of cyclohexane are heated for 2 hours at 80° C. while excluding air. Ethylene is forced into this mixture in an autoclave under a pressure of 200 atmospheres at room temperature. After purification with methanolic hydrochloric acid and tetrahydrofurane, 238 parts of solid polyethylene are obtained having the melting point 128° to 130° C.

*Example 5*

2 parts of aluminium powder and 10 parts of titanium-4-chloride are heated at 136° C. for 3 hours. The mixture is charged into an autoclave together with 78 parts of cyclohexane. Ethylene is forced in at room temperature up to a pressure of 200 atmospheres. The reaction is ended after 8 to 12 hours. After purification with methanolic hydrochloric acid and tetrahydrofurane, 176 parts of solid polyethylene are obtained having the melting point 126° to 129° C.

*Example 6*

2 parts of sodium powder, 6.8 parts of titanium-4-chloride and 78 parts of cyclohexane are heated for 2 hours at 80° C. while excluding air. Ethylene is then forced into this mixture under a pressure of 200 atmospheres in an autoclave at room temperature. After purification with methanolic hydrochloric acid and tetrahydrofurane, 140 parts of solid polyethylene are obtained.

*Example 7*

2 parts of aluminium powder and 10 parts of titanium-4-chloride are heated for 3 hours at 136° C. while excluding air. The mixture is then shaken with 60 parts of benzene. This benzene solution is then decanted from the aluminium powder. The aluminium powder is washed twice more in this way while excluding air and then suspended in 63 parts of cyclohexane. Ethylene is forced into this suspension under a pressure of 20 atmospheres in an autoclave at room temperature. After 20 hours, 140 parts of solid film-forming polyethylene have been formed which are purified by treatment with methanolic hydrochloric acid and tetrahydrofurane. Its melting point is 130° to 136° C.

*Example 8*

2 parts of aluminium powder, 10 parts of titanium-4-chloride and 1 part of aluminium chloride are heated for 10 minutes at 136° C. The reaction mixture is then purified as described in Example 7 by treatment three times, each time with 60 parts of cyclohexane. The aluminium powder pretreated in this way is charged together with 63 parts of cyclohexane into an autoclave. Ethylene is then forced in at room temperature up to a pressure of 20 atmospheres. After 20 hours, 100 parts of solid, film-forming polyethylene are obtained which are purified by treatment with methanolic hydrochloric acid and tetrahydrofurane. The melting point is 130° to 133° C.

*Example 9*

10 parts of aluminium chips, 10 parts of titanium-4-chloride, 1 part of aluminium chloride and 88 parts of benzene are heated for an hour at 80° C. while excluding air. The aluminium chips are then separated from the reaction mixture and charged together with 150 parts of cyclohexane into an autoclave. Ethylene is forced in at room temperature up to a pressure of 200 atmospheres. After 12 hours, 110 parts of solid, film-forming polyethylene are obtained having the melting point 130° to 135° C.

*Example 10*

16 parts of aluminium chips, 25 parts of titanium-4-chloride, 1 part of aluminium chloride and 70 parts of xylene are heated for 45 minutes at 120° C., while excluding air. The aluminium chips are then separated from the reaction mixture and charged together with 70 parts of cyclohexane into a vessel while excluding air. A vigorous stream of pure ethylene is led into this mixture at room temperature and under normal pressure. Solid polyethylene thereby separates and is withdrawn after 5 hours.

*Example 11*

2 parts of aluminium powder and 4 parts of aluminium chloride are heated for 2 hours at 180° C. in a closed vessel. To the cooled mixture there are added at room temperature 3 parts of titanium tetrachloride and 6 parts of benzene. After a few minutes, a brown reaction product is formed and this is introduced together with 400 parts of heptane into an autoclave. Ethylene is forced into the autoclave at 20° C. under a pressure of 20 atmospheres. After 30 hours, 200 parts of polyethylene are obtained having the softening point 134° C.

*Example 12*

1 part of aluminium powder, 2 parts of aluminium chloride, 1.5 parts of titanium tetrachloride, 5 parts of benzene and 25 parts of cyclohexane are treated in an autoclave for 20 hours at 20° C. with ethylene under 20 atmospheres pressure. 37 parts of polyethylene are obtained which softens at 142° C.

*Example 13*

1.5 parts of aluminium powder, 5 parts of titanium tetrachloride, 3 parts of aluminium chloride and 180 parts of benzene are heated for 1 hour at 80° C. The reaction mixture is diluted in an autoclave with 700 parts of cyclohexane. Ethylene is then forced in under a pressure of 20 atmospheres at 25° C. The reaction temperature is kept constant by cooling the autoclave. 750 parts of polyethylene are obtained of the molecular weight 200,000. The molecular weight is determined viscometrically.

*Example 14*

3 parts of aluminum granules, 5 parts of titanium tetrachloride and 1 part of naphthalene are heated for 2 hours at 140° C. After cooling, the reaction mixture is washed with benzene and then suspended in 30 parts of gasoline. In an autoclave, ethylene is allowed to act on the suspension under a pressure of 10 atmospheres at room temperature. 75 parts of polyethylene are obtained.

*Example 15*

1 part of aluminium powder, 5 parts of aluminium bromide, 5 parts of titanium tetrabromide and 100 parts of benzene are heated for 1 hour at 80° C. and then charged into an autoclave with 150 parts of cyclohexane. Ethylene is forced in under a pressure of 40 atmospheres at 60° C. 150 parts of polyethylene are obtained.

*Example 16*

1 part of magnesium powder, 1 part of aluminium chloride, 2 parts of titanium tetrachloride and 20 parts of benzene are heated under reflux for 1 hour. The reaction product is introduced with 30 parts of cyclohexane into an autoclave and treated with 40 atmospheres of ethylene at room temperature. 10 parts of film-forming polyethylene are obtained.

*Example 17*

Polymerization is carried out as in Example 16 but zinc powder is used instead of magnesium powder. 15 parts of film-forming polyethylene are obtained.

*Example 18*

A mixture of 1 part of sodium powder, 0.5 part of aluminium chloride, 1 part of titanium trichloride, 25 parts of benzene and 25 parts of cyclohexane is prepared, and ethylene is allowed to act thereon in an autoclave at room temperature under a pressure of 40 atmospheres, for 14 hours. 9 parts of film-forming polyethylene are obtained.

*Example 19*

0.5 part of aluminium powder, 2 parts of chromium-III-chloride, 1 part of aluminium chloride and 20 parts of benzene are heated for 1 hour at 80° C. and then charged with 30 parts of cyclohexane into an autoclave. 20 atmospheres of ethylene are forced in at room temperature. 8 parts of polyethylene are obtained which melts in the range of 134° to 148° C.

*Example 20*

By using in Example 19 the same amount of chromium-II-chloride instead of the chromium-III-chloride, 9 parts of polyethylene are obtained.

*Example 21*

Polymerization is carried out as in Example 19 but the same amount of vanadium-V-oxychloride is used instead of chromium-III-chloride. 10 parts of film-forming polyethylene are obtained.

*Example 22*

1 part of aluminium powder and 2 parts of aluminium chloride are heated in a closed vessel at 180° C. for 1 hour. The cooled mixture is then treated at room temperature with 1.5 parts of titanium-4-chloride and 4 parts of benzene. A brown reaction product is thus formed. The mixture is diluted with 100 parts of heptane. A mixture of 30 parts of styrene and 30 parts of heptane is allowed to drip into the resultant suspension while stirring at 70° C. The operation is carried out under nitrogen. The polystyrene obtained is freed from catalyst by washing with methanol and methanolic hydrochloric acid.

*Example 23*

If isoprene be polymerized in accordance with the description in Example 22, a solid, brittle polymer is obtained after washing with methanolic hydrochloric acid.

*Example 24*

10 parts of aluminium chips are heated for 1 hour at 80° C. with 3 parts of titanium tetrachloride, 2 parts of aluminium chloride and 50 parts of benzene. The chips are then separated from the reaction solution under nitrogen and charged with 60 parts of decahydronaphthalene into an autoclave. Ethylene is forced in at 130° C. to the extent of 20 atmospheres. Polyethylene thereby forms at the chips. The polyethylene is dissolved away from the chips by heating with further decahydronaphthalene at 150° C. By cooling the solution, the polymer separates out. After drying, 17 parts of film-forming polyethylene are obtained.

What we claim is:

A polymerization process which comprises contacting a normally gaseous monoolefin with a three component catalyst initially consisting of metallic aluminum, a titanium tetrahalide and aluminum trichloride, wherein the aluminum trichloride is present in a minor molar ratio with respect to the molar total of the other two components and recovering a polymer product which is predominantly solid.

References Cited in the file of this patent

UNITED STATES PATENTS

| | | |
|---|---|---|
| 2,721,189 | Anderson et al. | Oct. 18, 1955 |

FOREIGN PATENTS

| | | |
|---|---|---|
| 874,215 | Germany | Apr. 20, 1953 |
| 538,782 | Belgium | Dec. 6, 1955 |
| 533,362 | Belgium | Aug. 31, 1955 |
| 534,792 | Belgium | Jan. 31, 1955 |